US00RE40443E

(19) United States
(12) Reissued Patent
Sansone

(10) Patent Number: US RE40,443 E
(45) Date of Reissued Patent: Jul. 22, 2008

(54) SYSTEM AND METHOD FOR ACCOUNTING FOR POSTAGE FOR MAIL

(75) Inventor: Ronald P. Sansone, Weston, CT (US)

(73) Assignee: Pitney Bowes Inc., Stamford, CT (US)

(21) Appl. No.: 10/165,269

(22) Filed: Jun. 6, 2002

Related U.S. Patent Documents

Reissue of:
(64) Patent No.: 6,188,996
Issued: Feb. 13, 2001
Appl. No.: 09/083,952
Filed: May 22, 1998

(51) Int. Cl.
*G07B 17/02* (2006.01)

(52) U.S. Cl. ..... 705/408
(58) Field of Classification Search ..... 705/404, 705/406, 408, 410, 401; 235/375, 382, 462, 235/468, 491; 283/71, 72; 101/91
See application file for complete search history.

(56) References Cited

U.S. PATENT DOCUMENTS 3,869,986 A * 3/1975 Hubbard ..... 101/91
4,802,218 A * 1/1989 Wright et al. ..... 380/23
4,831,555 A * 5/1989 Sansone et al. ..... 364/519
5,122,967 A * 6/1992 Gilham ..... 700/235
5,257,196 A * 10/1993 Sansone ..... 705/403
5,408,416 A * 4/1995 Gilham ..... 705/406
5,554,842 A * 9/1996 Connell et al. ..... 235/491
5,569,317 A * 10/1996 Sarada et al. ..... 524/111
5,826,247 A * 10/1998 Markl et al. ..... 705/409
5,912,682 A 6/1999 Parkos ..... 347/40

FOREIGN PATENT DOCUMENTS

EP 0 219 847 * 4/1987

OTHER PUBLICATIONS

MOS machine used by U.S. Postal Service that prints labels.

* cited by examiner

*Primary Examiner*—John W. Hayes
(74) *Attorney, Agent, or Firm*—Joseph C. Kirincich; Angelo N. Chaclas

(57) ABSTRACT

A permit mail metering system that preprints the non-variable portion of an indicia. The pre-printed portions may be printed with a fluorescent and phosphorescent ink, while other pre-printed portions may be printed using standard colored or black inks. Some variable printed portions may be printed with a fluorescent and phosphorescent ink, while other variable portions may be printed using standard colored or black non-luminescent inks.

121 Claims, 7 Drawing Sheets

( PROIR ART )

( PROIR ART )

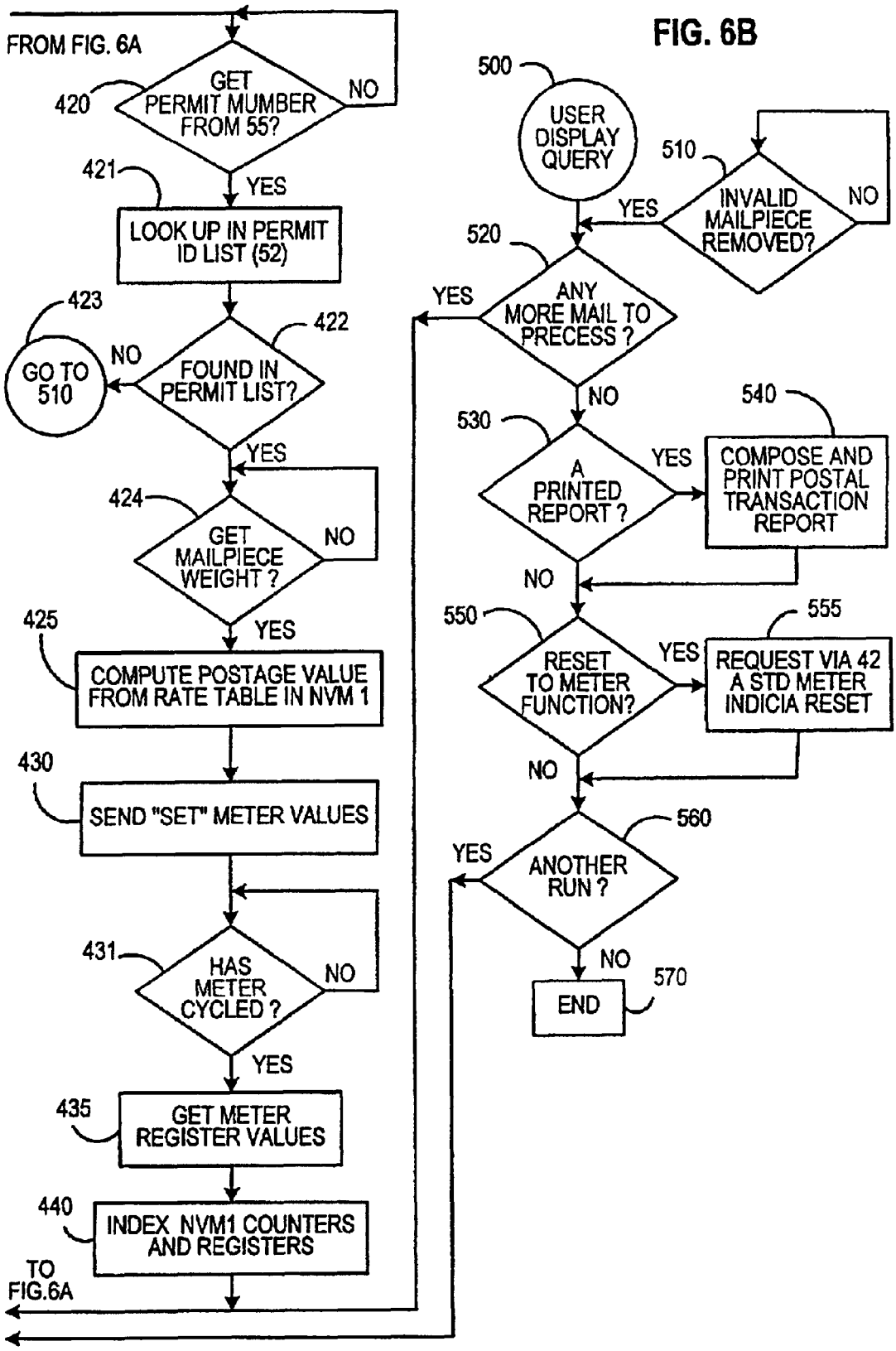
FROM FIG. 6A
420
GET PERMIT MUMBER FROM 55?
NO
YES
421
LOOK UP IN PERMIT ID LIST (52)
423
GO TO 510
NO
422
FOUND IN PERMIT LIST?
YES
424
GET MAILPIECE WEIGHT ?
NO
YES
425
COMPUTE POSTAGE VALUE FROM RATE TABLE IN NVM 1
430
SEND "SET" METER VALUES
431
HAS METER CYCLED ?
NO
YES
435
GET METER REGISTER VALUES
440
INDEX NVM1 COUNTERS AND REGISTERS
TO FIG.6A
FIG. 6B
500
USER DISPLAY QUERY
510
INVALID MAILPIECE REMOVED?
NO
YES
520
ANY MORE MAIL TO PRECESS ?
YES
NO
530
A PRINTED REPORT ?
YES
540
COMPOSE AND PRINT POSTAL TRANSACTION REPORT
NO
550
RESET TO METER FUNCTION?
YES
555
REQUEST VIA 42 A STD METER INDICIA RESET
NO
560
ANOTHER RUN ?
YES
NO
570
END

SYSTEM AND METHOD FOR ACCOUNTING FOR POSTAGE FOR MAIL

Matter enclosed in heavy brackets [ ] appears in the original patent but forms no part of this reissue specification; matter printed in italics indicates the additions made by reissue.

CROSS REFERENCE TO RELATED APPLICATIONS

Reference is made to commonly assigned co-pending patent application Ser. No. 09/083,605 filed herewith entitled "A System For Metering Permit Mail That Has An Encrypted Message Affixed To A Mail Piece" in the name of Ronald Sansone.

FIELD OF THE INVENTION

The invention relates generally to the field of mailing systems and more particularly to automated mailing systems.

BACKGROUND OF THE INVENTION

Governments have created postal services for collecting, sorting and distributing the mail. The postal service typically charges mailers for delivering the mail. Mailers may pay the post office for its service by purchasing a stamp, i.e., a printed adhesive label, issued by the post office at specified prices, that is affixed to all letters, parcels or other mail matter to show prepayment of postage. The placing of one or more stamps on a mail piece is a labor intensive endeavor. Thus, stamps typically are used by individuals, small or home offices and small businesses.

Another means of payment accepted by the post office is mail that is metered by a postage meter. A postage meter is a mechanical or electromechanical device that: maintains, through mechanical or "electronic registers" or "postal security devices," an account of all postage printed, and the remaining balance of prepaid postage; and prints postage postmarks (indicia) or provides postage postmarks (indicia) information to a printer, that are accepted by the postal service as evidence of the prepayment of postage. A postage meter is able to affix two to eight postal indicia to two to eight mail pieces in one second. Thus, postage meters may be used by individuals small or home offices, small businesses and large business.

Other means of payment accepted by the post office is payment for manifest mail and payment for permit mail. In a typical manifest mailing system, a mailer produces mail in accordance with a mail manifest list and determines the quantity of mail and weight thereof. Then the mailer prepares the appropriate postal forms and delivers the mail and forms to the post office. Thereupon, the post office checks the manifest list, the appropriate forms and checks the quantity and weight of the mail. The post office also requires permit imprints to be printed on the mail piece. The mailer prepares postal forms and brings the mail and postal forms to the post office. The post office checks the forms, checks the mail pieces and confirms that the completed forms coincide with the checked mail pieces. Then the postal clerk debits the value of the postage placed on the mail pieces from the mailer's postal account. Groups of individuals and businesses that produce very large quantities of mail use manifest and permit mail.

A disadvantage of the current manifest and permit mailing systems is that the systems are very labor intensive. The intensive labor component is the completion of the forms and submission of the mail and forms by the mailer to the post office and the review and acceptance of the forms and associated payment process and mail by the post office. Thus, many people are assisted by machines used to produce permit mail. However, the mailer and the post office use manual acceptance procedures to check the mail and forms and receive appropriate payment.

Another disadvantage of the prior art is that permit mail is only able to enter the post office during certain postal working hours.

SUMMARY OF THE INVENTION

This invention overcomes the disadvantages of the prior art by utilizing a system that reduces the amount of labor required to produce permit mail. The foregoing is advantageous to the mailer because it reduces the amount of time the mailer spends in the preparation of postal forms and the performance of postal procedures. The variable data indicia printer is able to run at a more rapid rate than normal indicia printers because the amount of information to be reprinted is much less. This is important because it saves the mailer labor and time and it enables the mail to reach the post office sooner. The foregoing is advantageous to the post office by reducing the acceptance processing time. This reduces the post office's labor and enables the mail to enter the delivery system sooner.

The smaller mailer's mail would enter the facer canceller and be automatically processed. The high volume mailer's mail would be accelerated through acceptance because it would follow metered acceptance procedures.

This system also provides means for the mailer to add additional information fields to convey postal instructions to the postal service. This invention accomplishes the forgoing by preprinting the non-variable portion of an indicia. Some pre-printed portions may be printed with a fluorescent and phosphorescent ink, while other pre-printed portions may be printed using standard colored or black inks. Some variable printed portions may be printed with a fluorescent and phosphorescent ink, while other variable portions may be printed using standard colored or black inks.

An advantage of this invention is that it provides more accurate reporting and checking of the number of permit mail pieces. Thus, the mailer pays for the number of mail permit pieces actually mailed and the post office receives the correct revenue for the number of permit mail pieces that it processes.

Another advantage of this invention is that it provides additional security for permit mail. The foregoing is accomplished by placing variable information within the permit indicia or in the vicinity of the permit indicia. The variable information may be printed with a fluorescent and phosphorescent ink to further increase the security of the permit indicia. The variable information may also be printed with a black or colored ink.

A further advantage of this invention is that it also allows permit mail to be placed in letter boxes or delivered to the postal clerk in the lobby of the post office.

BRIEF DESCRIPTION OF THE DRAWINGS

FIG. 4 is a drawing showing the pre-printed postal indicia of FIG. 3 containing variable information specific to the piece of mail that the indicia has been affixed to;

DETAILED DESCRIPTION OF THE PREFERRED EMBODIMENT

Figure 1:
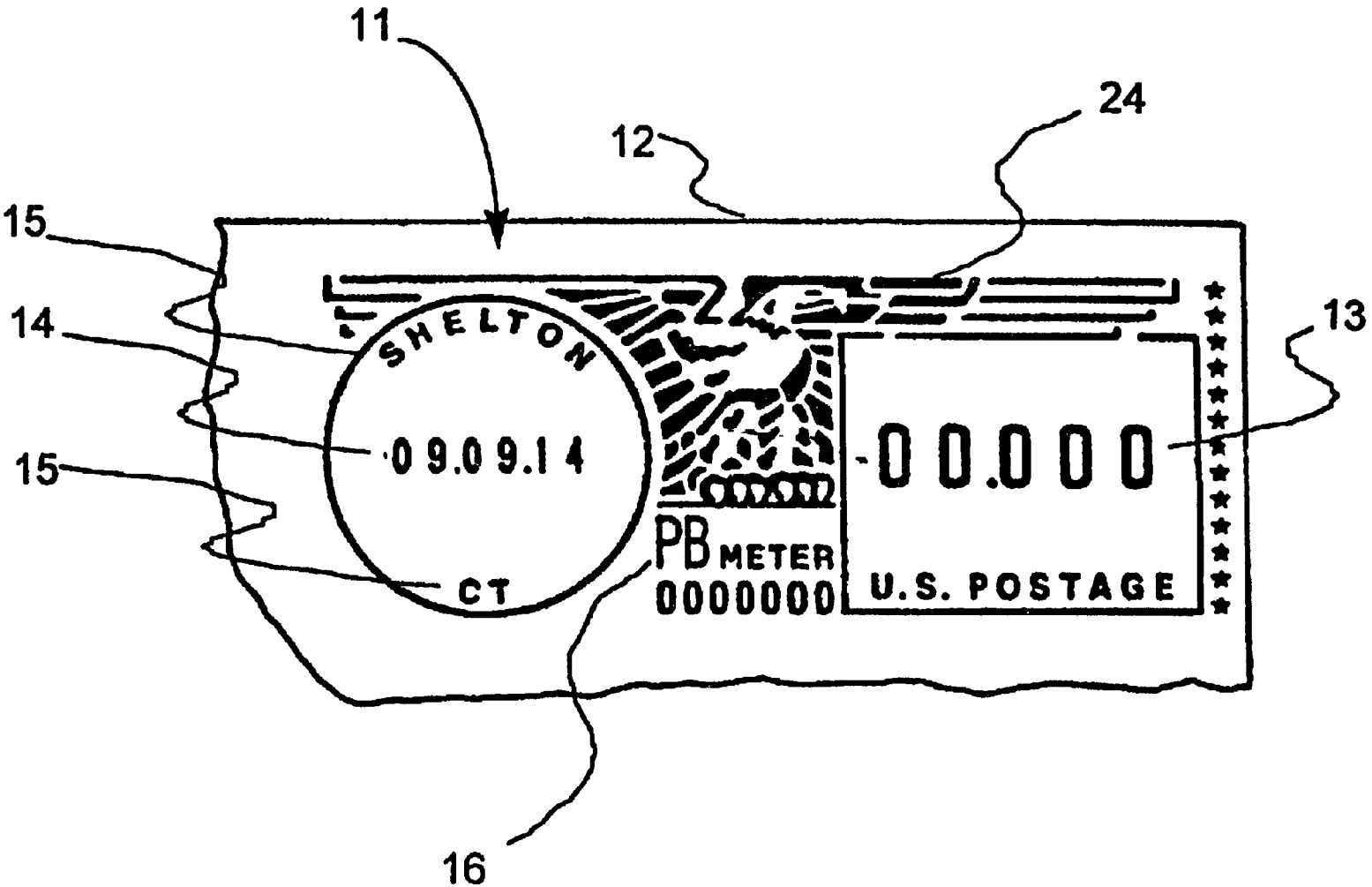
FIG. 1 is a drawing of a conventional prior art postal meter indicia containing normal accounting and security features, printed by conventional printing or bit map generated printing.

Referring now to the drawings in detail, and more particularly to FIG. 1, the reference character 11 represents a postal indicia that contains normal security features (meter number) printed by conventional printing or bitmap generated printing. The postal indicia 11 contains a dollar amount 13, the date 14 that the postal indicia was affixed to mail piece 12, the place the mail piece originated from 15, and the postal meter serial number 16 (for authentication).

Figure 2:
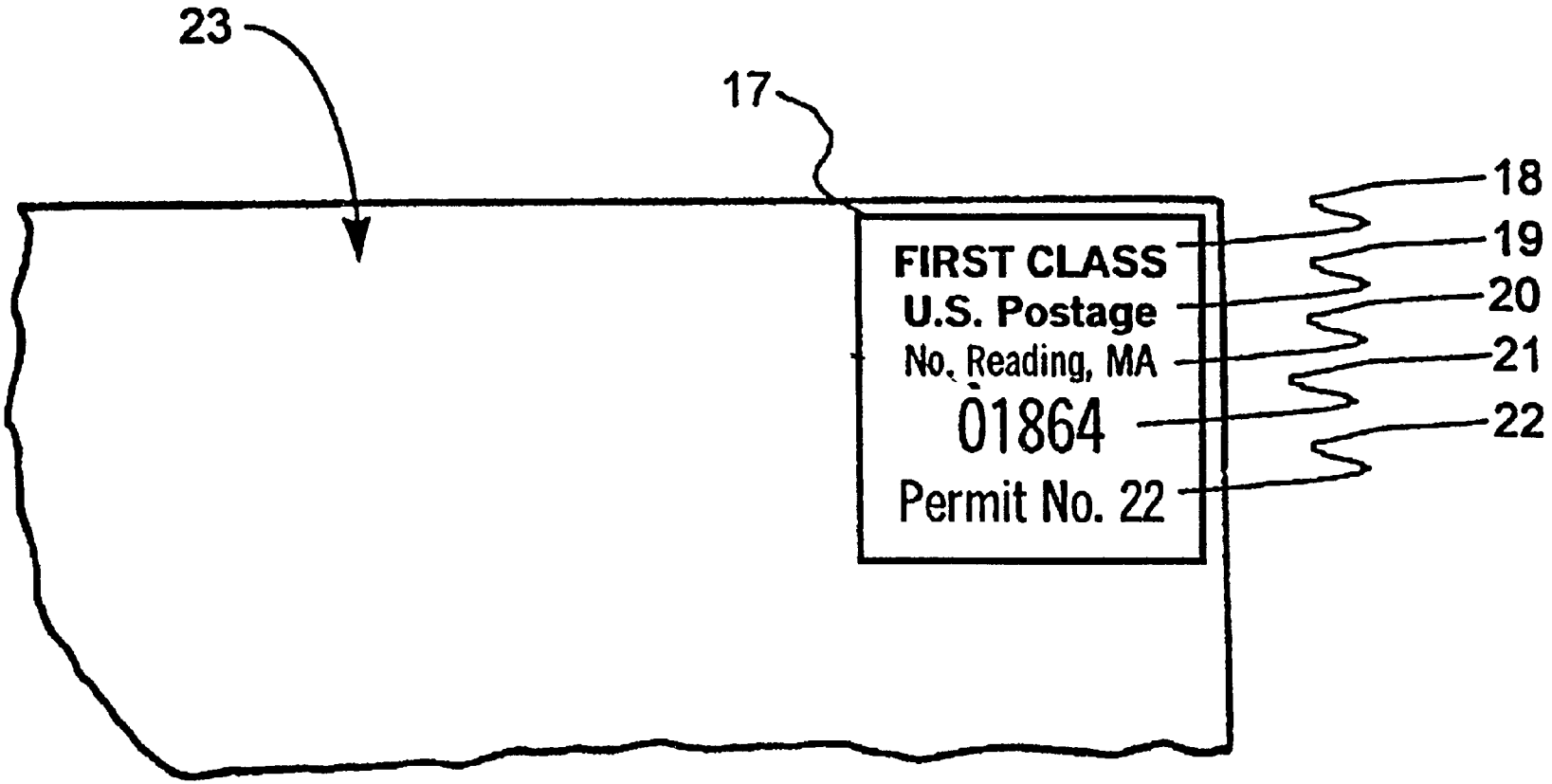
FIG. 2 is a drawing of a conventional prior art permit indicia containing normal features, either pre-printed by conventional means or by bitmap generated printing.

FIG. 2 is a drawing of a conventional prior art permit indicia containing normal features, either pre-printed by conventional means or by bitmap generated printing. The permit indicia 17 contains the class of mail 18, the name of the country 19, the city and state 20 of the post office that issued the permit, the zip code of the post office that issued the permit 21, and the permit Number 22.

Figure 3:
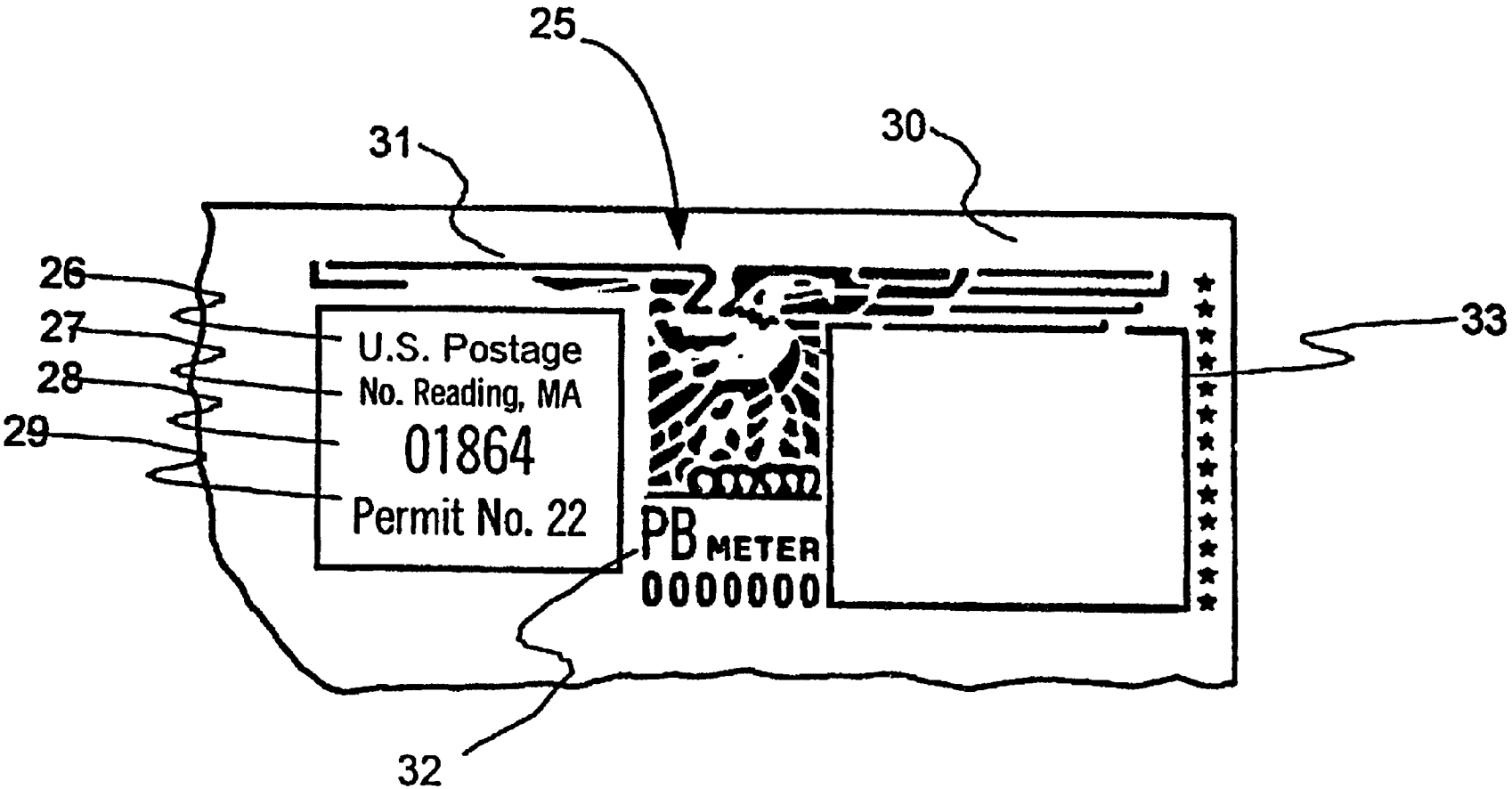
FIG. 3 is a drawing of a drawing of a pre-printed metered permit postal indicia.

FIG. 3 is a drawing of a pre-printed metered permit postal indicia 25 on a mail piece 30. Indicia 25 contains the name of the country 26 to whom the postage is going to be paid, the city and state 27 of the post office that issued the permit, the zip code 28 of the post office that issued the permit, the permit number 29, an eagle 31, the postal meter serial number 32 and a block 33.

Indicia 25 may be pre-printed by conventional means or by bitmap generated printing, at a location remote from the mailer, i.e., at a printing subcontractor or at the mailer's premises, etc. Indicia 25 may be printed with a dual luminescent ink, i.e., an ink that is fluorescent and phosphorescent when radiated with ultraviolet light. An ink that is both fluorescent and phosphorescent when radiated with ultraviolet light is disclosed in the Sarada et al. U.S. Pat. No. 5,569,317, entitled "Fluorescent And Phosphorescent Tagged Ink For Indicia", herein incorporated by reference. It will be obvious to one skilled in the art that pre-printed indicia 25 may be printed with a normal black ink, red ink or any ink having a desired color. Indicia 25 may also be printed with a fluorescent ink or a phosphorescent ink.

Typically, luminescence will become visible to the naked eye and sensors when stimulated or excited by suitable radiation. Fluorescent inks and phosphorescent inks are types of luminescent inks. The emission of light from a fluorescent ink is caused by the absorption of energy (light or electromagnetic radiation) into the ink's molecules, which causes an excited state to emit or be fluorescent, and ceases abruptly when the energy source is removed. The emission of light from a phosphorescent ink will persist for a time interval after the [ink] *light* source has been removed. A modulated ultra violet light source and suitable sensors can sense the pulses of fluorescent and phosphorescent ink combined on the mail piece.

The United States Postal Service and other Postal Services are currently selling stamps that have been printed with phosphorescent inks. They also require and accept postal indicia that have been printed by a postage meter that uses fluorescent inks. Current fluorescent inks that are used in postage meters approved by the United States Postal Service contain a fluorescent ink that is excited by a 254 nm ultra violet light source that emits a fluorescent light in the orange to red region of the visible spectrum between 580 to 650 nm.

Mail sorting equipment like the Advanced Facer Canceling System, manufactured by Siemens (Electrocom), are being used at Postal Incoming Mail Processing Stations to detect, sort and then cancel the phosphorescent stamps that have been affixed to mail pieces. These systems also check whether or not the postal indicia affixed to the mail pieces were affixed by an authorized meter, i.e., whether or not the indicia was made with a fluorescent ink.

The United States Postal Service Advanced Facer Canceller System (AFCS) faces (arranges mail so all addresses and indicia are facing the same way), cancels the stamp-bearing mail and then sorts letter mail into three mail streams: pre-bar coded letters, OCR readable(typed/in machine imprinted) letters, and hand-written or script letters.

A dual luminescent ink is used so that the facer canceller will receive enough signal to trigger its sortation capabilities. The facer canceller may be set to recognize a mail piece having a dual luminescent ink as a new form of mail, that exhibits the phosphorescence of a stamp and the fluorescence of a postal indicia. The facer canceller may let the mail piece enter the mail system if the postage has been paid. If prior art permit mail entered the mail stream at this juncture, the mail piece would be rejected because prior art permit mail had to enter the post office and be subjected to the post office acceptance procedures.

A facer canceller will cancel a phosphorescent stamp, will not cancel a fluorescent postal indicia and will remove other mail pieces that do not have FIMs. A FIM is a specified special bar code used by the post office.

Figure 4:
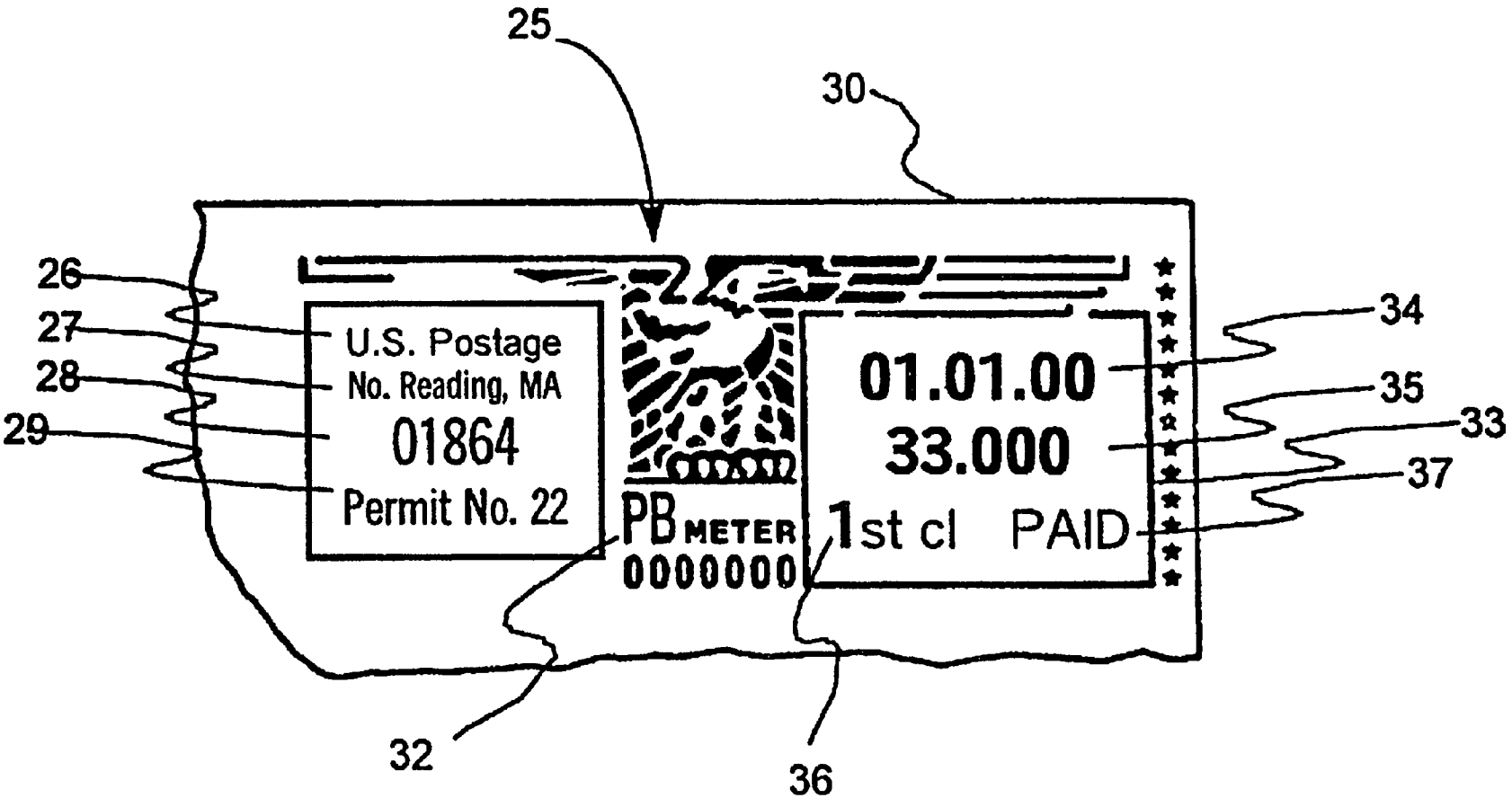

FIG. 4 is a drawing showing pre-printed postal indicia 25 of FIG. 3 containing variable information specific to the piece of mail that the indicia has been affixed to printed in block 33. Block 33 contains the date 34, the amount of postal 35, the class of postage 36 and an indication that the postal has been paid 37. It will be obvious to one skilled in the art that the information printed in block 33 may be printed in another area of indicia 25 or in an area in the vicinity of indicia 25.

In the event indicia 25 was preprinted with a fluorescent ink, then the date 34, the amount of postage 35, the class of postage 36, an indication that the postage has been paid 37 and the postal meter serial number 32 would be printed with a phosphorescent ink. In the event indicia 25 was preprinted with a phosphorescent ink, then the date 34, the amount of postage 35, the class of postage 36, an indication that the postage has been paid 37 and the postal meter serial number 32 would be printed with a fluorescent ink. In this example, the dual luminescence on the mail piece is performed in two steps.

The variable information printed in block 33 or in the vicinity of indicia 25 may be printed with a dual luminescent ink or with a normal black ink, red ink or any ink having a desired color. Thus, either the variable information 34, 35, 36 and 37 or the preprinted information in indicia 25 will be printed with a dual luminescent ink.

Figure 5:
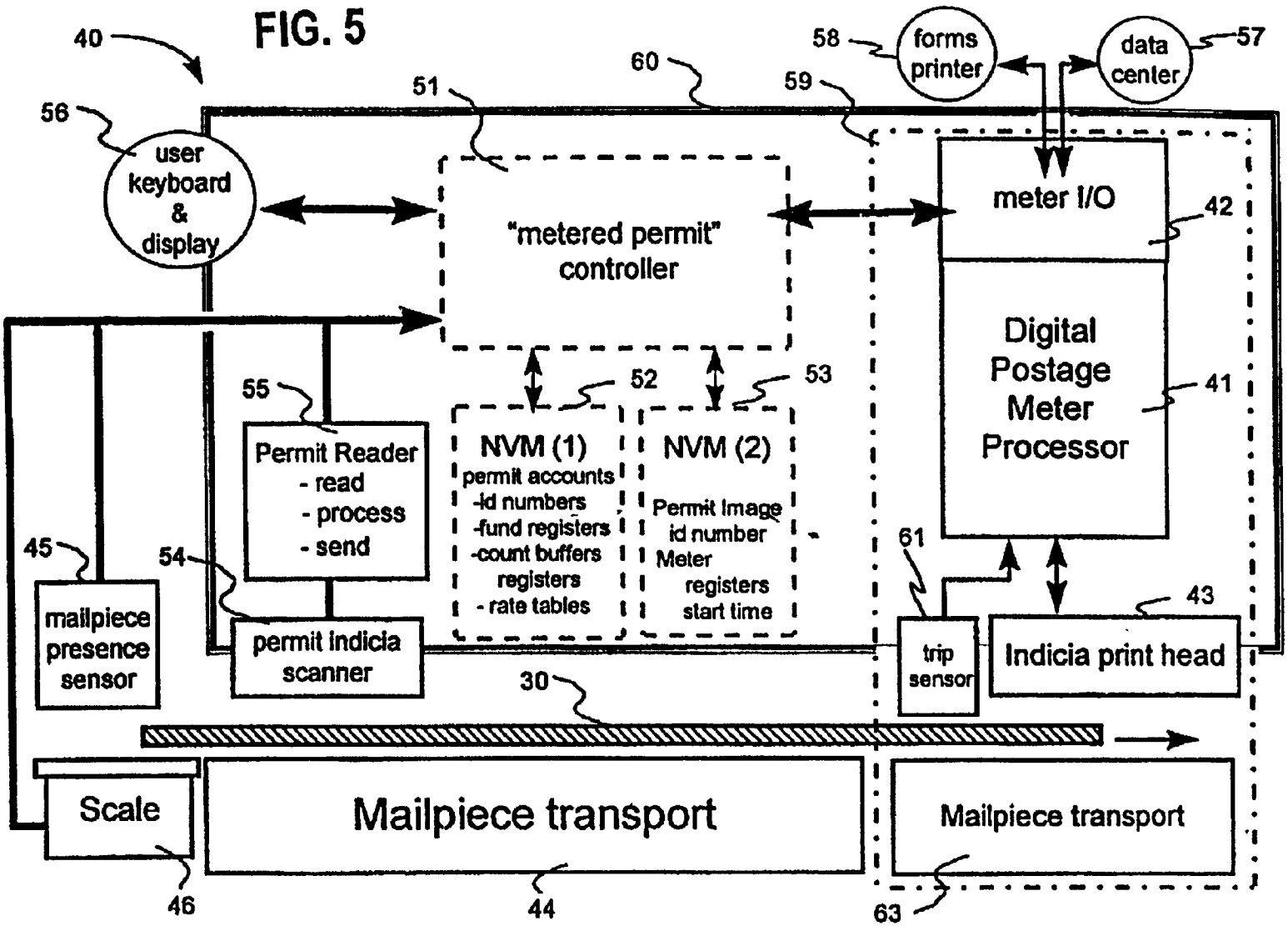
FIG. 5 is a block drawing of a permit mail metering system.

FIG. 5 is a block drawing of permit mail metering system 40. Meter system 40 includes: a digital postage meter 59; a meter permit controller 51 that is coupled to meter I/O 42; a non-volatile memory 52 that is coupled to controller 51; a non-volatile memory 53 that is coupled to controller 51; a permit mail indicia scanner 54; a permit identification reader 55 that is coupled to scanner 54 and controller 51; a user keyboard and display 56 that is coupled to controller 51; a forms printer 58 that is coupled to I/O 42 and a data center 57, a mail piece presence sensor 45 that is coupled to controller 51, and a mail piece transport 44. Digital postage meter 59 includes: a meter processor 41; a meter I/O 42; an indicia print head 43 that is coupled to processor 41; a mail piece transport 44; a meter trip sensor 61 that is coupled to processor 41 and a mail piece transport 63. Meter 59 also includes some support electronics (not shown) which are well-known to one skilled in the art. Postage meter 59 may be the B700 Post Perfect postage meter manufactured by Pitney Bowes Inc. of Stamford Connecticut. Processor 41, I/O 42, controller 51, memories 52 and 53, and reader 55 are contained in a secure housing 60. Secure housing 60 may be constructed in accordance with United States Federal Information Processing Standard 140-1, herein incorporated by reference.

Funds may be added to meter 59 by having meter 59 reset by data center 57. An example of a postage meter being reset by a data center is set forth in Eckert's U.S. Pat. No. 3,596,247 entitled "Automatic Register Setting Apparatus", dated Jul. 27, 1971, herein incorporated by reference.

When controller 51 receives instructions to print a report, the report will be printed by forms printer 58. Printer 58 will print a report containing: the date and time that indicia or blocks of indicia were affixed to mail pieces 30; the number of mail pieces 30 that an indicia has been affixed to; the total value of the affixed indicia; and internal billing identification, etc.

The aforementioned report may include other information desired by the post office or mailer.

When mail piece presence sensor 45 senses the presence of mail piece 30 in transport 44, I/O 42 sends a signal to controller 51. When meter trip sensor 61 senses the presence of mail piece 30, indicia print head 43 will be enabled to print. Meter system 40 may be run by an operator to process a small quantity of mail, i.e., one mail piece. The operator enters relevant information in response to questions displayed by controller 51 on display 56, via the display keyboard. When instructed to insert a mail piece by controller 51, the operator places a mail piece 30 on mail piece transport 44. At this point, controller 51 controls the operation of permit mail metering system 40. Controller 51 controls the operation of permit mail metering system 40, which will be more fully described in the description of FIG. 6.

Figure 6A:
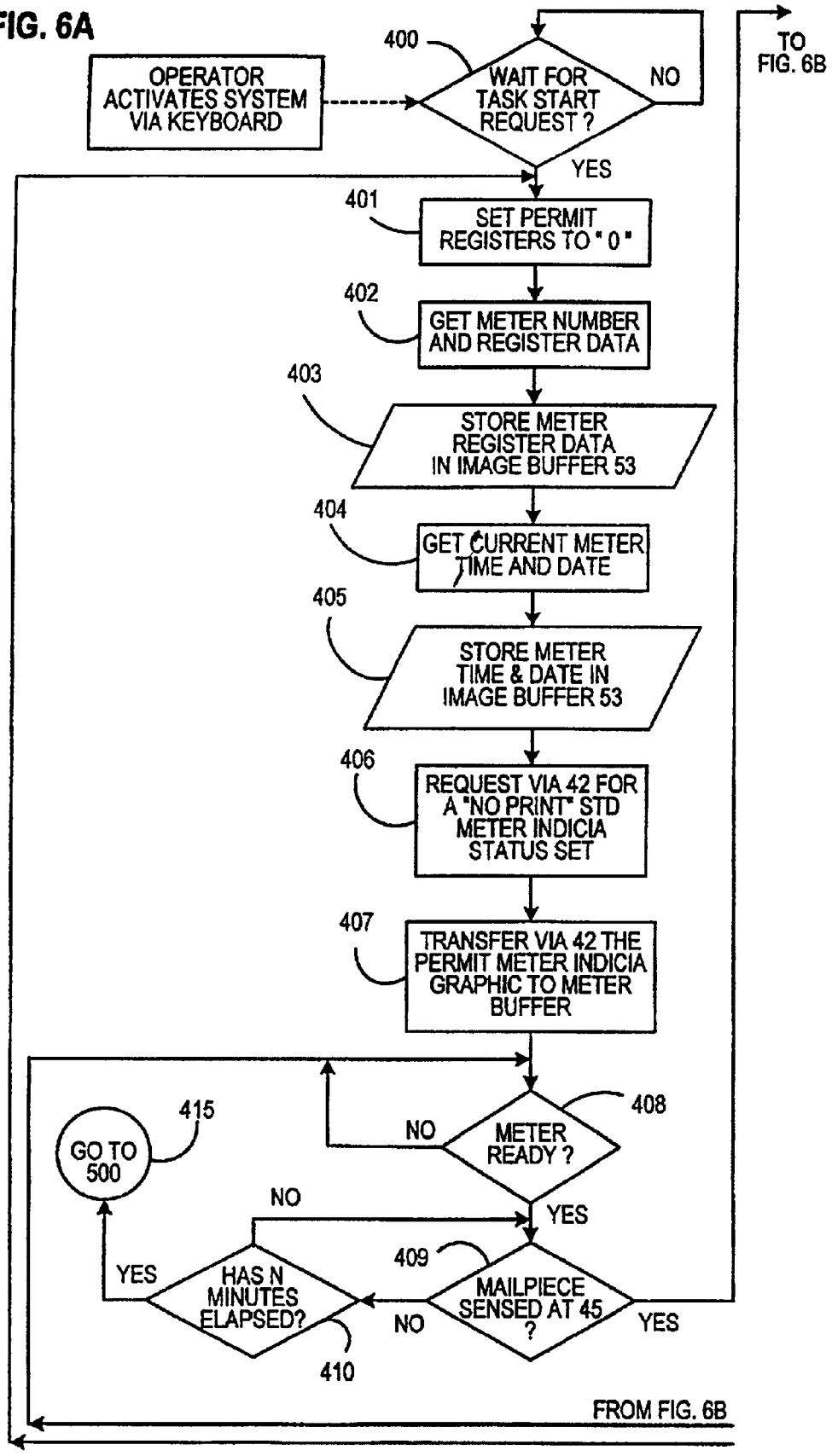
FIG. 6 is a drawing of a flow chart of the program contained in meter permit controller 51 of FIG. 5.

FIG. 6 is a drawing of a flow chart of the program contained in meter permit controller 51 of FIG. 5. The program begins when the operator activates permit mail metering system 40 by entering information into keyboard and display 56 via the display keyboard. Then the program goes to decision block 400 to determine whether or not the task start request has been received. If the task start request has not been received, then the program goes back to the input of block 400. If the task start request has been received, then the program goes to block 401 to set the permit registers to "0". Now the program goes to block 402 to obtain the meter serial number and register data. Then the program goes to block 403 to store the meter register data in non-volatile memory 53. At this point program proceeds to block 404 to obtain the current meter time and date. Then the program goes to block 405 to store the meter time and date in non-volatile memory 53. Now the program goes to block 406 to request via meter I/O 42 for meter 59 to be set so that it will not print a standard meter postal indicia. In block 407, the program transfers the permit meter indicia graphics to processor 41 via I/O 42.

At this point, the program goes to decision block 408. Decision block 408 determines whether or not meter 59 is ready. If block 408 determines that meter 59 is not ready, the program goes back to the input of block 408. If block 408 determines that meter 59 is ready, then the program proceeds to decision block 409. Decision block 409 determines whether or not mail piece 30 was sensed by mail piece presence sensor 45. If block 409 determines that mail piece 30 was not sensed by sensor 45, the program proceeds to decision block 410. Decision Block 410 determines whether or not N minutes has elapsed. If N minutes has not elapsed, the program proceeds back to the input of decision block 409. If block 410 determines that N minutes has elapsed, the program goes to block 415 and then to block 500 entitled user display query. Block 500 displays one or more questions on display 56. The operator reads the questions on display 56. If decision blocks 409 determines that mail piece 30 was sensed by sensor 45, the program proceeds to the input of decision block 420.

Block 420 determines whether or not the permit number was obtained from permit reader 55. If the permit number was not obtained from reader 55, the program goes back to the input of block 420. If block 420 determines that the permit number was obtained from reader 55, the program goes to block 421 to look up the permit identification number in memory 52. Now the program goes to decision block 422. Decision block 422 determines whether or not the permit identification number was found in the permit list contained in memory 52. If block 422 determines that the number was not in the list, the program goes to block 423 and then to decision block 510. If block 422 determines that the number was in the list, the program goes to block 424.

Decision block 424 determines whether or not the mail piece weight was obtained *from scale 46*. If the mail piece weight was not obtained, then the program goes back to the input of decision block 424. If the mail piece weight was obtained, the program goes to block 425 to compute the postal value from the rate table in memory 52. Now the program goes to block 430 *to* send *the* "set" meter values, i.e., obtain the correct postal values from the rate tables in memory 52. Then the program goes to decision block 431. Decision block 431 determines whether or not meter 59 has cycled. If meter 59 has not printed an indicia, the program goes back to the input of block 431. If meter 59 has printed an indicia, the program goes to block 435 to obtain the meter register values from memory 52. Then the program goes to block 440. Block 440 indexes the counters and registers in memory 52. Now the program proceeds to the input of block 408.

Decision block 510 determines whether or not the operator has removed an invalid mail piece 30 from meter 59. If block 510 determines that the operator removed an invalid mail piece 30, the program goes to decision block 520. Decision block 520 determines whether or not meter 59 has any more mail pieces 30 to process. If block 520 determines there are more mail pieces 30 to process, the program goes back to the input of decision block 408. If block 520 determines there are no more mail pieces 30 to process, the program goes to the input of decision block 530. Block 530 determines whether or not a report was requested to be printed. If the operator wants a report, the operator enters the relevant information via keyboard and display 56. If block 530 determines that a report was requested, the program goes to block 540. Block 540 composes and causes printer 58 to print a postal transaction report. The postal transactional report may contain the information contained in memories 52 and 53.

After the completion of the printing of the postal transaction action report, the program proceeds to the input of decision block 550. If decision block 550 determined that a printed report was not required, the program would also proceed to the input of block 550. Block 550 determines whether or not to reset the meter function. If Block 550 determines to reset the meter function, the program goes to block 555. Block 555 requests meter I/O 42 to perform a standard meter indicia reset. Then the program goes to the input of decision block 560. If block 550 determines not to reset the meter function, the program will also go to the input of decision block 560. Block 560 determines whether or not another run was requested. If another run was requested, the program goes to the input of block 401 to set the permit registers to 0. If another run was not requested, the program goes to block 570 and ends.

The above specification describes a new and improved permit mailing system. It is realized that the above description may indicate to those skilled in the art additional ways in which the principles of this invention may be used without departing from the spirit. It is, therefore, intended that this invention be limited only by the scope of the appended claims.

What is claimed is:

1. A system for metering permit mail, said system comprising:

means for pre-printing information on a mail piece to produce a postal indicia;

means for printing variable payment information within the postal indicia or within the vicinity of the postal indicia [or]*; and* wherein a portion of the pre-printed information is printed with a fluorescent ink and the remaining portion of the pre-printed information is printed with a non-luminescent ink.

2. The system claimed in claim 1, wherein said first and second means are in different locations.

3. The system claimed in claim 1, further including means for collecting payment for the printed variable payment information.

4. The system claimed in claim 3, wherein said means for collecting payment is a postage meter.

5. The system claimed in claim 3, further including: means for recording payments for the printed postal indicia.

6. The system claimed in claim 3, further including:

a scale coupled to the postage meter to weigh the mail piece; and a rate table coupled to the meter so that the correct postage may be computed.

7. The system claimed in claim 6, further including a data center that is coupled to the rate table to update rates as required by the post.

8. The system claimed in claim 3, further including a data center that is coupled to said collecting means so that additional funds may be remotely added to said means for collecting payment.

9. The system claimed in claim 3, wherein said means for collecting is a postal security device.

10. The system claimed in claim 9, wherein said means for collecting records [collects] variable [security] *payment* information.

11. A system for metering permit mail, said system comprising:

means for pre-printing information on a mail piece to produce a postal indicia;

means for printing variable payment information within the postal indicia or within the vicinity of the postal indicia*; and* wherein a portion of the pre-printed information is printed with a phosphorescent ink and the remaining portion of the pre-printed information is printed with a non-luminescent ink.

12. A system for metering permit mail, said system comprising:

means for pre-printing information on a mail piece to produce a postal indicia;

means for printing variable payment information [with] *within* the postal indicia or within the vicinity of the postal indicia*; and* wherein a portion of the variable information is printed with a fluorescent ink and the remaining portion of the variable information is printed with a non-luminescent ink.

13. A system for metering permit mail, said system comprising:

means for pre-printing information on a mail piece to produce a postal indicia;

means for printing variable payment information within the postal indicia or within the vicinity of the postal indicia[.] *; and* wherein a portion of the variable information is printed with a phosphorescent ink and the remaining portion of the variable information is printed with a non-luminescent ink.

14. A method for paying for permit mail, said method includes the steps of:

placing funds in a postage meter;

printing a permit mail postal indicia with a postage meter; and deducting the value of the printed permit postal indicia from the meter.

15. The method claimed in claim 14, wherein said printing step further includes the steps of:

pre-printing a portion of the postal indicia with fixed information; and printing variable information within the postal indicia or within the vicinity of the postal indicia.

16. The method claimed in claim 15, wherein the step of pre-printing further includes the step of pre-printing the fixed information with a dual luminescent ink.

17. The method claimed in claim 15, wherein the step of printing variable information includes printing the variable information with a dual luminescent ink.

18. The method claimed in claim 15, wherein the step of pre-printing further includes the step of pre-printing the fixed information with a fluorescent ink and the variable information with a phosphorescent ink.

19. The method claimed in claim 15, wherein the step of pre-printing further includes the step of pre-printing the fixed information with a phosphorescent ink and the variable information with a florescent ink.

20. The method claimed in claim 15, wherein the step of pre-printing further includes the step of pre-printing a portion of the fixed information with a phosphorescent ink and the remaining portion of the pre-printed information with a non-luminescent ink.

21. The method claimed in claim 15, wherein the step of printing variable information further includes the step of printing a portion of the variable information with a phosphorescent ink and the remaining portion of the variable information with a non-luminescent ink.

22. The method claimed in claim 15, wherein the step of pre-printing further includes the step of pre-printing a portion of the fixed information with a fluorescent ink and the remaining portion of the pre-printed information with a non-luminescent ink.

23. The method claimed in claim 15, wherein the step of printing variable information further includes the step of printing a portion of the variable information with a fluorescent ink and the remaining portion of the variable information with a non-luminescent ink.

24. The method claimed in claim 15, further including the step of:

adding additional funds to the postage meter.

25. The method claimed in claims 14, further including the step of:

adding additional funds to the postage meter from a remote location.

*26. A system for metering mail, the system comprising:*

*first means for pre-printing information to produce a postal indicia; and*

*second means for printing variable payment information within, or within a vicinity of, the postal indicia; and*

*wherein a portion of the pre-printed information is printed with a luminescent ink and a remaining portion of the pre-printed information is printed with a non-luminescent ink.*

*27. The system of claim 26, wherein the first means and the second means are in different locations.*

*28. The system of claim 27, further including postage metering means for collecting payment for the printed variable payment information.*

*29. The system of claim 28, wherein the postal indicia is representative of permit mail.*

*30. The system of claim 29, further comprising:*

*scale means for weighing a mail piece; and*

*rate means for determining a correct postage amount based upon a weight of the mail piece, wherein the variable payment information is the correct postage amount.*

*31. The system of claim 30, wherein the postage metering means is a postal security device.*

*32. The system of claim 31, wherein the luminescent ink is fluorescent.*

*33. The system of claim 31, wherein the luminescent ink is phosphorescent.*

*34. The system of claim 31, wherein the luminescent ink is fluorescent and phosphorescent.*

*35. The system of claim 31, wherein the pre-printed information is printed directly on the mail piece.*

*36. The system of claim 29, further comprising:*

*a scale adapted to weigh a mail piece; and*

*a rate table adapted to determine a correct postage amount based upon a weight of the mail piece, wherein the variable payment information is the correct postage amount.*

*37. The system of claim 36, wherein the postage metering means is a postal security device.*

*38. The system of claim 37, wherein the luminescent ink is fluorescent.*

*39. The system of claim 37, wherein the luminescent ink is phosphorescent.*

*40. The system of claim 37, wherein the luminescent ink is fluorescent and phosphorescent.*

*41. The system of claim 37, wherein the pre-printed information is printed directly on the mail piece.*

*42. A method for metering mail comprising the steps of:*

*receiving a recording medium having pre-printed information in the form of a postal indicia;*

*printing variable payment information within, or within a vicinity of, the postal indicia; and*

*wherein a portion of the pre-printed information is printed with a luminescent ink and a remaining portion of the pre-printed information is printed with a non-luminescent ink.*

*43. The method of claim 42, wherein the variable payment information is printed in a different location than the pre-printed information.*

*44. The method of claim 43, further comprising the step of:*

*collecting payment for the printed variable payment information with a postage meter.*

*45. A method for metering mail comprising the steps of:*

*receiving a recording medium having pre-printed information in the form of a postal indicia;*

*printing variable payment information within, or within a vicinity of, the postal indicia; and*

*collecting payment for the printed variable payment information with a postage meter;*

*wherein a portion of the pre-printed information is printed with a luminescent ink and a remaining portion of the pre-printed information is printed with a non-luminescent ink*

*wherein the variable payment information is printed in a different location than the pre-printed information; and*

*wherein the postal indicia is representative of permit mail.*

*46. The method of claim 45, wherein the recording medium is a mail piece, further comprising the steps of:*

*weighing a mail piece; and*

*determining a correct postage amount based upon a weight of the mail piece, wherein the variable payment information is the correct postage amount.*

*47. The method of claim 46, wherein the postage meter is a postal security device.*

*48. The method of claim 47, wherein the luminescent ink is fluorescent.*

*49. The method of claim 47, wherein the luminescent ink is phosphorescent.*

*50. The method of claim 47, wherein the luminescent ink is fluorescent and phosphorescent.*

*51. The method of claim 47, wherein the pre-printed information is printed directly on the mail piece.*

*52. A system for metering mail, the system comprising:*

*first means for pre-printing information to produce a postal indicia; and*

*second means for printing variable payment information within, or within a vicinity of, the postal indicia; and*

*wherein a portion of the variable information is printed with a luminescent ink and a remaining portion of the variable information is printed with a non-luminescent ink.*

*53. The system of claim 52, wherein the first means and the second means are in different locations.*

*54. The system of claim 53, further including postage metering means for collecting payment for the printed variable payment information.*

*55. A system for metering mail, the system comprising:*

*first means for pre-printing information to produce a postal indicia;*

*second means for printing variable payment information within, or within a vicinity of, the postal indicia; and*

*postage metering means for collecting payment for the printed variable payment information;*

*wherein a portion of the variable information is printed with a luminescent ink and a remaining portion of the variable information is printed with a non-luminescent ink and the postal indicia is representative of permit mail.*

*56. The system of claim 55, further comprising:*

*scale means for weighing a mail piece; and*

*rate means for determining a correct postage amount based upon a weight of the mail piece, wherein the variable payment information is the correct postage amount.*

*57. The system of claim 56, wherein the postage metering means is a postal security device.*

*58. The system of claim 57, wherein the luminescent ink is fluorescent.*

*59. The system of claim 57, wherein the luminescent ink is phosphorescent.*

*60. The system of claim 57, wherein the luminescent ink is fluorescent and phosphorescent.*

*61. The system of claim 57, wherein the pre-printed information is printed directly on the mail piece.*

*62. A method for metering mail comprising the steps of:*

*receiving a recording medium having pre-printed information in the form of a postal indicia;*

*printing variable payment information within, or within a vicinity of, the postal indicia; and*

*wherein a portion of the variable payment information is printed with a luminescent ink and a remaining portion of the variable payment information is printed with a non-luminescent ink.*

*63. The method of claim 62, wherein the variable payment information is printed in a different location than the pre-printed information.*

*64. The method of claim 63, further comprising the step of:*

*collecting payment for the printed variable payment information with a postage meter.*

*65. A method for metering mail comprising the steps of:*

*receiving a recording medium having pre-printed information in the form of a postal indicia;*

*printing variable payment information within, or within a vicinity of, the postal indicia; and*

*collecting payment for the printed variable payment information with a postage meter;*

*wherein a portion of the variable payment information is printed with a luminescent ink and a remaining portion of the variable payment information is printed with a non-luminescent ink,*

*wherein the variable payment information is printed in a different location than the pre-printed information; and*

*wherein the postal indicia is representative of permit mail.*

*66. The method of claim 65, wherein the recording medium is a mail piece, further comprising the steps of:*

*weighing a mail piece; and*

*determining a correct postage amount based upon a weight of the mail piece, wherein the variable payment information is the correct postage amount.*

*67. The method of claim 66, wherein the postage meter is a postal security device.*

*68. The method of claim 67, wherein the luminescent ink is fluorescent.*

*69. The method of claim 67, wherein the luminescent ink is phosphorescent.*

*70. The method of claim 67, wherein the luminescent ink is fluorescent and phosphorescent.*

*71. The method of claim 67, wherein the pre-printed information is printed directly on the mail piece.*

*72. A method for paying for permit mail, the method comprising the step(s) of:*

*placing funds in a postage metering system;*

*printing a permit mail postal indicia with a digital printer operatively coupled to the postage metering system; and*

*deducting a value of postage associated with the permit mail postal indicia from the postage metering system.*

*73. The method of claim 72, wherein the postage metering system includes a postal security device.*

*74. The method of claim 73, wherein the permit mail postal indicia includes a luminescent portion and a non-luminescent portion.*

*75. The method of claim 74, wherein the luminescent portion includes pre-printed information and the non-luminescent portion includes variable payment information.*

*76. A system for metering permit mail, the system comprising:*

*a postage meter, said postage meter having means for receiving funds and adding said funds to a balance of funds thereby creating a new balance of funds;*

*a digital printer operatively coupled to the postage meter for printing a permit mail postal indicia; and*

*a register operatively coupled to the postage meter for deducting a value of postage associated with the permit mail postal indicia from the balance of funds maintained in the postage meter.*

*77. The system of claim 76, wherein the postage meter includes a postal security device.*

*78. The system of claim 77, wherein the permit mail postal indicia includes a luminescent portion and a non-luminescent portion.*

*79. The system of claim 78, wherein the luminescent portion includes pre-printed information and the non-luminescent portion includes variable payment information.*

*80. A method for paying for a mail piece with a postage metering system, the method comprising the step(s) of:*

*storing a balance of prepaid postage funds available for dispensing in a memory of the postage metering system;*

*providing a pre-printed portion of a postal indicia at least partially printed with luminescent ink, the pre-printed portion of the postal indicia being printed remotely from the postage metering system;*

*controlling printing of a variable payment portion of the postal indicia with non-luminescent ink using the postage metering system; and*

*deducting a value associated with the postage indicia from the balance of prepaid postage funds.*

*81. The method of claim 80, wherein the postage metering system includes a postal security device for storing and accounting for the balance of prepaid postage funds.*

*82. The method of claim 81, wherein the variable payment portion of the postal indicia is printed directly on a mail piece.*

*83. The method of claim 82, further comprising the step(s) of:*

*weighing the mail piece; and*

*determining a correct postage amount based upon a weight of the mail piece, wherein the variable payment information is the correct postage amount.*

*84. The method of claim 82, wherein the luminescent ink is fluorescent.*

*85. The method of claim 83, wherein the luminescent ink is phosphorescent.*

*86. The method of claim 83, wherein the luminescent ink is fluorescent and phosphorescent.*

*87. A postage metering system comprising:*

*a memory for storing a balance of prepaid postage funds available for dispensing by the postage metering system;*

*a printer that receives a sheet having a pre-printed portion of a postal indicia at least partially printed with luminescent ink, the pre-printed portion of the postal indicia being printed remotely from the postage metering system;*

*a control that controls the printing of a variable payment portion of the postal indicia with non-luminescent ink; and*

*wherein a processor deducts a value associated with the postage indicia from the balance of prepaid postage funds.*

*88. The postage metering system of claim 87, wherein the register is a postal security device for storing and accounting for the balance of prepaid postage funds.*

*89. The postage metering system of claim 87, wherein the control causes the variable payment portion of the postal indicia to be printed directly on a mail piece.*

*90. The postage metering system of claim 89, further comprising:*

*a scale operatively connected to the register for weighing the mail piece; and*

*a rate table operatively connected to the scale for determining a correct postage amount based upon a weight of the mail piece, wherein the variable payment information is the correct postage amount.*

*91. The postage metering system of claim 90, wherein the luminescent ink is fluorescent.*

*92. The postage metering system of claim 90, wherein the luminescent ink is phosphorescent.*

*93. The postage metering system of claim 90, wherein the luminescent ink is fluorescent and phosphorescent.*

*94. A method for paying for a mail piece with a postage metering system, the method comprising the step(s) of:*

*storing a balance of prepaid postage funds available for dispensing in a register of the postage metering system;*

*providing a pre-printed portion of a postal indicia, the pre-printed portion of the postal indicia being printed remotely from the postage metering system;*

*controlling printing of a variable payment portion of the postal indicia with non-luminescent ink using the postage metering system, wherein a portion of the variable payment information is printed with a luminescent ink and a remaining portion of the variable payment information is printed with a non-luminescent ink; and*

*deducting a value associated with the postage indicia from the balance of prepaid postage funds.*

*95. The method of claim 94, wherein the postage metering system includes a postal security device for storing and accounting for the balance of prepaid postage funds.*

*96. The method of claim 95, wherein the variable payment portion of the postal indicia is printed directly on a mail piece.*

*97. The method of claim 96, further comprising the step(s) of:*

*weighing the mail piece; and*

*determining a correct postage amount based upon a weight of the mail piece, wherein the variable payment information is the correct postage amount.*

*98. The method of claim 97, wherein the luminescent ink is fluorescent.*

*99. The method of claim 97, wherein the luminescent ink is phosphorescent.*

*100. The method of claim 97, wherein the luminescent ink is fluorescent and phosphorescent.*

*101. A postage metering system comprising:*

*a register having a memory for storing a balance of prepaid postage funds available for dispensing in the postage metering system;*

*means for receiving a sheet having a pre-printed portion of a postal indicia, the pre-printed portion of the postal indicia being printed remotely from the postage metering system;*

*means for printing variable payment information, wherein a portion of the variable payment information is printed with a luminescent ink and a remaining portion of the variable payment information is printed with a non-luminescent ink; and*

*wherein the register having means for deducting a value associated with the postage indicia from the balance of prepaid postage funds.*

*102. The postage metering system of claim 101, wherein the register is a postal security device for storing and accounting for the balance of prepaid postage funds.*

*103. The postage metering system of claim 102, wherein the means for printing the variable payment portion of the postal indicia prints directly on a mail piece.*

*104. The postage metering system of claim 103, further comprising:*

*a scale operatively connected to the register for weighing the mail piece; and*

*a rate table operatively connected to the scale for determining a correct postage amount based upon a weight of the mail piece, wherein the variable payment information is the correct postage amount.*

*105. The postage metering system of claim 104, wherein the luminescent ink is fluorescent.*

*106. The postage metering system of claim 104, wherein the luminescent ink is phosphorescent.*

*107. The postage metering system of claim 104, wherein the luminescent ink is fluorescent and phosphorescent.*

*108. A system for metering mail, the system comprising:*

*an applicator arranged to form a luminescent ink portion of a postal indicia;*

*a first printer arranged to pre-print static information as part of the postal indicia, said static information being printed in the vicinity of the luminescent ink portion; and*

*a second printer arranged to print variable information as part of the postal indicia subsequent to the pre-printing of the static information, said variable information being printed in the vicinity of the static information, wherein a portion of the variable information is printed with a luminescent ink and a remaining portion of the variable information is printed with a non-luminescent ink.*

*109. The system of claim 108 wherein the postal indicia is affixed to a mail piece by a postage meter.*

*110. The system of claim 109, wherein the postal indicia is representative of permit mail.*

*111. The system of claim 109, wherein the luminescent ink is fluorescent.*

*112. The system of claim 109, wherein the luminescent ink is phosphorescent.*

*113. The system of claim 109, wherein the luminescent ink is fluorescent and phosphorescent.*

*114. A system for metering mail, the system comprising:*

*a postage meter which receives a recording medium having pre-printed information in the form of a postal indicia, at least a portion of the pre-printed information is printed with luminescent ink, the pre-printed information being printed remotely from the postage meter;*

*a printer associated with the postage meter, said printer printing variable payment information within a vicinity of the postal indicia;*

*a register having a memory and being associated with the postage meter, said register storing a balance of prepaid postage funds available for dispensing by the postage meter, the funds in said register being deducted by said postage meter in an amount equal to the variable payment information printed.*

*115. The system of claim 114 wherein the postal indicia is affixed to a mail piece by a postage meter.*

*116. The system of claim 115, wherein the postal indicia is representative of permit mail.*

*117. The system of claim 115, wherein the luminescent ink is fluorescent.*

*118. The system of claim 115, wherein the luminescent ink is phosphorescent.*

*119. The system of claim 115, wherein the luminescent ink is fluorescent and phosphorescent.*

*120. A method for paying for a mail piece with a postage metering system, the method comprising the step(s) of:*

*storing a balance of prepaid postage funds available for dispensing in a memory of the postage metering system;*

*providing a pre-printed portion of a postal indicia that is at least partially printed with fluorescent ink, the pre-printed portion being printed remotely from the postage metering system;*

*printing within a vicinity of the pre-printed portion a variable payment portion of a postal indicia, said variable payment portion being printed with non-luminescent ink using the postage metering system; and*

*deducting a value associated with the postage indicia from the balance of prepaid postage funds.*

*121. A postage metering system comprising:*

*a memory for storing a balance of prepaid postage funds available for dispensing in the postage metering system;*

*a printer that receives a sheet having a pre-printed portion of a postal indicia at least partially printed with florescent ink, the pre-printed portion being printed remotely from the postage metering system, said printer prints a variable payment portion of a postal indicia within a vicinity of the pre-printed portion, said variable payment portion being printed with non-luminescent ink; and*

*a processor that deducts a value associated with the postage indicia from the balance of prepaid postage funds in the memory.*

* * * * *